US012298875B2

United States Patent
Chen et al.

(10) Patent No.: US 12,298,875 B2
(45) Date of Patent: May 13, 2025

(54) EMPLOYING SAMPLED REGISTER VALUES TO INFER MEMORY ACCESSES BY AN APPLICATION

(71) Applicant: Microsoft Technology Licensing, LLC, Redmond, WA (US)

(72) Inventors: Danny Chen, Woodinville, WA (US); Colin M. Francis, Bellevue, WA (US); Eric M. Vaughn, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 399 days.

(21) Appl. No.: 17/837,507

(22) Filed: Jun. 10, 2022

(65) Prior Publication Data
US 2023/0401135 A1 Dec. 14, 2023

(51) Int. Cl.
| G06F 11/36 | (2006.01) |
| G06F 9/38 | (2018.01) |
| G06F 9/54 | (2006.01) |
| G06F 11/30 | (2006.01) |
| G06F 9/30 | (2018.01) |

(Continued)

(52) U.S. Cl.
CPC ............ *G06F 11/3037* (2013.01); *G06F 9/30* (2013.01); *G06F 9/30101* (2013.01); *G06F 9/30145* (2013.01); *G06F 9/3016* (2013.01); *G06F 11/3495* (2013.01); *G06F 11/3636* (2013.01)

(58) Field of Classification Search
CPC ............ G06F 11/3037; G06F 11/3495; G06F 11/3636; G06F 9/3016; G06F 9/30101; G06F 9/30; G06F 9/3855; G06F 9/30145
See application file for complete search history.

(56) References Cited

U.S. PATENT DOCUMENTS

| 6,941,545 B1* | 9/2005 | Reese ................. G06F 9/45541 717/136 |
| 6,961,930 B1 | 11/2005 | Waldspurger et al. |

(Continued)

OTHER PUBLICATIONS

Guru Venkataramani et al., MemTracker: Efficient and Programmable Support for Memory Access Monitoring and Debugging, 2007 IEEE, [Retrieved on Nov. 25, 2024]. Retrieved from the internet: <URL: https://ieeexplore.ieee.org/stamp/stamp.jsp?tp=&arnumber=4147668> 12 Pages (273-284) (Year: 2007).*

(Continued)

*Primary Examiner* — Anibal Rivera
(74) *Attorney, Agent, or Firm* — Rainier Patents, P.S.

(57) ABSTRACT

This document relates to memory access profiling. One example relates to a method or technique that can include obtaining samples collected when executing an application, the samples comprising sampled register values that were present in one or more registers of a processor when the samples were collected. The method or technique can also include identifying sampled instructions of the application that were executing when the samples were collected and other instructions of the application. The method or technique can also include evaluating the sampled instructions and one or more of the other instructions using the sampled register values to identify memory accesses by the application. The method or technique can also include outputting the identified memory accesses.

20 Claims, 21 Drawing Sheets

(51) Int. Cl.
   *G06F 11/34*      (2006.01)
   *G06F 11/362*     (2025.01)

(56)                References Cited

U.S. PATENT DOCUMENTS 8,762,951  B1 *   6/2014  Kosche .............. G06F 11/3476
                                                          717/127
   9,367,316  B2 *   6/2016  Bradbury ............ G06F 11/3466
   2005/0071608 A1    3/2005  Dewitt et al.
   2007/0028010 A1 *  2/2007  Krasnansky ............. G06F 1/28
                                                           710/18
   2007/0271442 A1 * 11/2007  Shaw ...................... G06F 9/322
                                                        712/E9.023
   2013/0246754 A1    9/2013  Bradbury et al.
   2018/0004530 A1 *  1/2018  Vorbach ................ G06F 9/3885
   2018/0060213 A1 *  3/2018  Mola .................. G06F 11/3664

OTHER PUBLICATIONS

"International Search Report and Written Opinion Issued in PCT Application No. PCT/US23/022180", Mailed Date: Aug. 24, 2023, 12 Pages.

Moseley, et al., "Identifying Potential Parallelism via Loop-centric Profiling," Proceedings of the 4th International Conference on Computing Frontiers, May 2007, (pp. 143-151).

\* cited by examiner

| Line | Assembly | Comments |
|---|---|---|
| 1 | jmp    (0x00007ff69ba503de) | Branch to another location |
| 2 | mov    rax,484h | Load value of 0x484 to RAX |
| 3 | dec    dword ptr [rax+r13] | Decrement the DWORD at address in RAX+R12 |
| 4 | mov    rax, [r13] | Load value from address R13 to RAX |
| 5 | mov    qword ptr [r14],rax | Store value in RAX to address in R14 |
| 6 | dec    qword ptr [r14+8],rax | Store value in RAX to address R14+0x8 |
| 7 | mov    qword ptr [r14+10h],rax | Store value in RAX to address RAX+0x10 |
| 8 | lea    r11,[rsp+70h] | Compute address RSP+0x70 and store in R11 |
| 9 | mov    rbx,qword ptr [r11+38h] | Load value from address R11+0x38 to RBX |
| 10 | mov    rbp,qword ptr [r11+40h] | Load value from address R11+0x40 to RBP |
| 11 | mov    rsi,qword ptr [r11+48h] | Load value from address R11+0x48 to RSI |
| 12 | mov    rax,qword ptr [rsi] | Load value from address in RSI to RAX |
| 13 | mov    rsp,r11 | Copy value from R11 to RSP |
| 14 | pop    r15 | Pop value from RSP to R15 |
| 15 | ret | Return to calling function |

CODE SNIPPET 210

REGISTER CONTEXT 220

| Registers | |
|---|---|
| %RAX | 0x1000 |
| %RSI | 0x3000 |
| %RBP | 0x5000 |
| %R13 | 0x7000 |
| %RSP | 0x10000 |
| %RBX | 0x2000 |
| %RDI | 0x4000 |
| %R11 | (0x6000) 0x10070 |
| %R14 | 0x8000 |

FIG. 2

| 9 | mov rbx,qword ptr [r11+38h] | Load value from address R11+0x38 to RBX |

| 10 | mov rbp,qword ptr [r11+40h] | Load value from address R11+0x40 to RBP |

| 11 | mov rsi,qword ptr [r11+48h] | Load value from address R11+0x48 to RSI |

| 12 | mov rax,qword ptr [rsi] | Load value from address in RSI to RAX |

| 13 | mov rsp,r11 | Copy value from R11 to RSP |

| 14 | pop r15 | Pop value from RSP to R15 |

| 15 | ret | Return to calling function |

| 7 | mov qword ptr [r14+10h],rax | Store value in RAX to address RAX+0x10 |

| 6 | dec qword ptr [r14+8],rax | Store value in RAX to address R14+0x8 |

| 5 | mov qword ptr [r14],rax | Store value in RAX to address in R14 |

| 4 | mov rax, [r13] | Load value from address R13 to RAX |

| 3 | dec dword ptr [rax+r13] | Decrement the DWORD at address in RAX+R12 |

| 2 | mov rax,484h | Load value of 0x484 to RAX |

| 1 | jmp | (0x00007ff69ba503de) | Branch to another location |

Sampling Configuration

801 → Sampling Basis — Time

802 → Sampling Interval: — 10 ms

803 → Sampling Start Date — May 4, 2022

804 → Sampling Start Date — May 8, 2022

805 → Sample Path: — F:\Samples

806 → Code Path: — G:\Code

807 → Submit

GUI 800

FIG. 8

Memory Utilization Report For LoopApplication.exe

*This report is based on 1,347,328 samples collected from 36 client devices from May 4, 2022 through May 8, 2022*

| | |
|---|---|
| Overall Fragmentation | 32% |
| Data Object Mem Utilization | Loop14.responses[] 426KB <br> Loop6.big_struct 112 KB <br> Loop2.local_var 82 KB |
| Function Mem Utilization | Loop9.execute() 235 KB <br> Loop6.execute() 112 KB <br> Loop4.execute() 82 KB |
| Unaccessed Data Objects | Loop9.interval <br> Loop6.test_var <br> Loop4.small_struct |

GUI 900

FIG. 9

EMPLOYING SAMPLED REGISTER VALUES TO INFER MEMORY ACCESSES BY AN APPLICATION

BACKGROUND

One important characteristic of a software application relates to memory utilization. Typically, developers aim to reduce memory utilization of a given software program for various reasons, such as physical or operating system constraints on total memory usage and/or performance drawbacks of using too much memory. Various approaches have been adopted for determining the memory access patterns of a given application. However, as discussed more below, existing approaches have numerous drawbacks.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The description generally relates to techniques for sampling memory access patterns of an application. One example relates to a method or technique that can include obtaining samples collected when executing an application, the samples comprising sampled register values that were present in one or more registers of a processor when the samples were collected. The method or technique can also include obtaining sampled instructions that were executing when the samples were collected and other instructions of the application. The method or technique can also include evaluating the sampled instructions and one or more of the other instructions using the sampled register values to identify memory accesses by the application. The method or technique can also include outputting the identified memory accesses.

Another example includes a system that includes a processor and a storage medium storing instructions. When executed by the processor, the instructions can cause the system to obtain samples collected when executing an application, the samples comprising sampled register values. The instructions can also cause the system to obtain application code of the application, the application code including sampled instructions that were executing when the samples were taken and other instructions of the application. The instructions can also cause the system to iterate through the other instructions of the application while updating the sampled register values to obtain updated register values. The instructions can also cause the system to identify memory accesses based at least on the other instructions and the sampled register values or the updated register values, and to output the memory accesses.

Another example includes a computer-readable storage medium storing instructions which, when executed by a computing device, cause the computing device to perform acts. The acts can include receiving user input specifying a sampling configuration for an application and configuring sampling of the application according to the sampling configuration. The acts can also include obtaining samples collected when executing the application according to the sampling configuration, the samples comprising sampled register values of a processor when the samples were collected. The acts can also include identifying memory access characteristics of the application by analyzing the sampled register contents, sampled instructions that were executing when the samples were collected, and other instructions of the application.

The above listed examples are intended to provide a quick reference to aid the reader and are not intended to define the scope of the concepts described herein.

BRIEF DESCRIPTION OF THE DRAWINGS

The Detailed Description is described with reference to the accompanying figures. In the figures, the left-most digit(s) of a reference number identifies the figure in which the reference number first appears. The use of similar reference numbers in different instances in the description and the figures may indicate similar or identical items.

FIG. 2 illustrates an example code snippet and sampled register values, consistent with some implementations of the present concepts.

FIG. 8 illustrates an example graphical user interface for configuring sampling of an application, consistent with some implementations of the present concepts.

FIG. 9 illustrates an example graphical user interface for outputting results of analyzing memory accesses by an application, consistent with some implementations of the present concepts.

DETAILED DESCRIPTION

Overview

Figure 1:
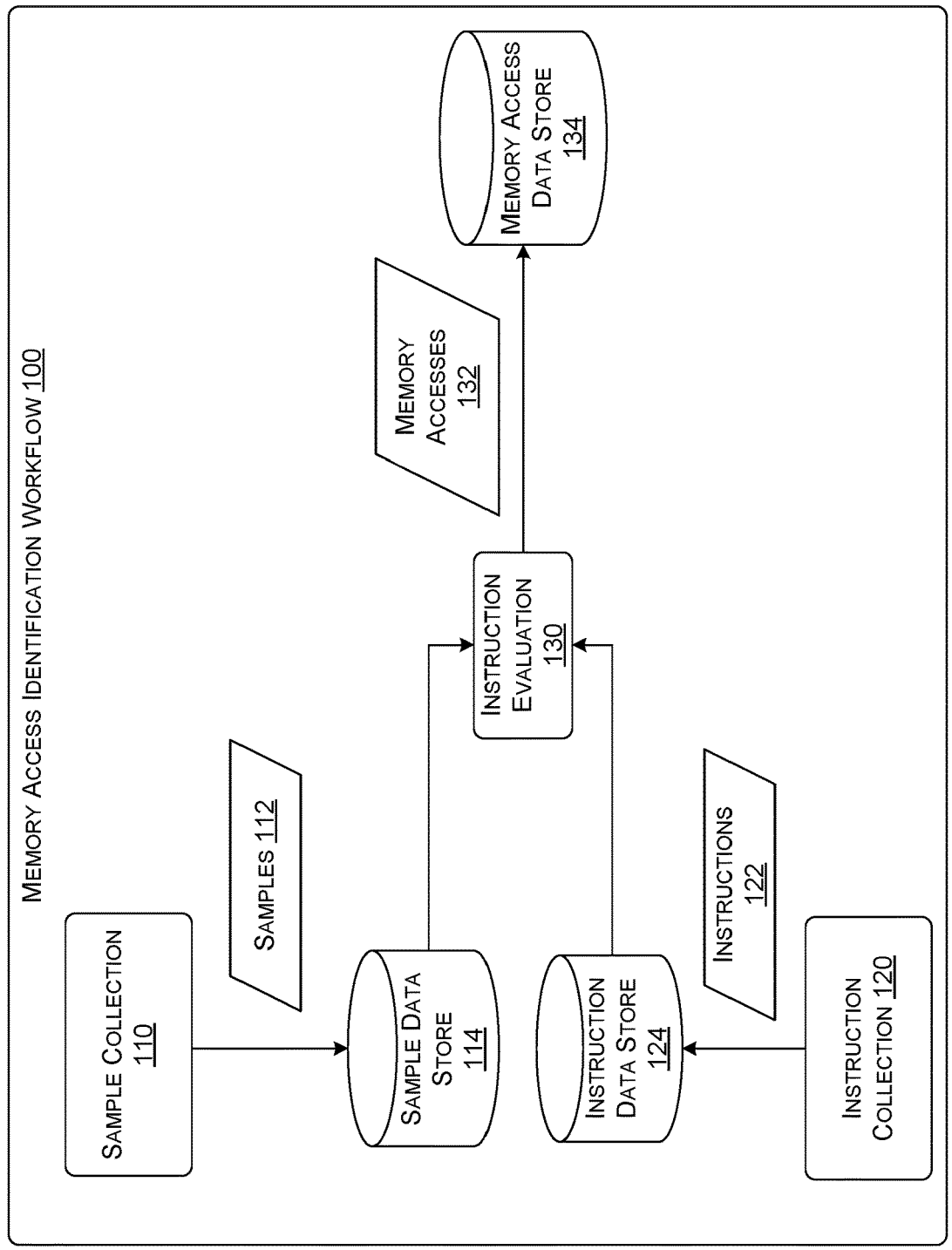
FIG. 1 illustrates an example workflow for analysis of memory accesses by an application, consistent with some implementations of the present concepts.

As noted above, software developers generally desire detailed information into runtime memory accesses by their software. Such detailed memory access information can facilitate program debugging as well as performance optimization. Existing techniques for profiling of memory utilization of an application generally fall into several categories—memory paging approaches, sampling-based approaches, or detailed instruction tracing.

Taking memory paging approaches first, operating systems often employ a page table to maintain mappings between virtual addresses and physical addresses. One way to profile the memory utilization by an application involves tracking which pages are accessed by the application, e.g., using entries in the page table. However, these approaches generally infer memory utilization at coarse granularity, e.g., by marking pages as used or "hot" or not used or "cold." Most CPU's use memory page sizes are 4 KB or larger, and thus approaches that rely on memory paging behavior generally do not give developers insight into memory utilization at granularities finer than 4 KB.

Taking sampling-based approaches next, these techniques generally involve interrupting the execution of an application to determine which instruction is currently executing, and then identifying any memory accesses that are accessed by that instruction. Sampling can be lightweight if not done too frequently, and thus may not cause perceptible changes in program behavior. However, sampling approaches generally only determine what memory addresses are accessed by the sampled instruction, i.e., the instruction that is currently executing when a given sample is taken. In addition, sampling of memory addresses in this manner generally involves specific supporting hardware, such as Intel Processor Event-Based Sampling ("PEBS") or AMD Instruction-Based Sampling ("IBS").

Taking instruction tracing approaches next, these techniques generally involve executing a program within another execution context that instruments each instruction executed by the application. For instance, an application can be executed and traced within a debugger or a separate runtime that records each instruction executed the program together with context such as register state and/or contents of memory accessed by the program. However, instruction tracing generally involves very high overhead (e.g., additional CPU cycles and memory resources) that can alter program behavior and make large-scale performance profiling impractical. Thus, while instruction tracing can provide very detailed information about code execution in a development environment, it is not generally feasible to perform instruction tracing on a widescale basis in production environments.

The disclosed implementations offer an improved sampling-based approach that uses sampled instructions and sampled register values to infer additional information about memory accesses that is not provided by traditional sampling-based memory profiling techniques. For instance, the disclosed implementations can obtain application code that includes other instructions that occur in the application with the sampled instructions (e.g., nearby instructions), and can evaluate those other instructions using the sampled register values. By iteratively updating the sampled registered values and continuing to evaluate the other instructions, the disclosed implementations can infer addresses and/or memory sizes of memory accessed by the other instructions, whereas traditional sampling-based techniques tend to only identify memory accesses by the instructions that are executing when the application is sampled. As a consequence, the disclosed implementations can infer fine-grained memory access patterns of an application using a lightweight sampling-based approach that extracts far more information about memory accesses by an application on a per-sample basis than traditional techniques.

Example Analysis Workflow

FIG. 1 shows an example memory access identification workflow 100 that can be employed to infer memory accesses by an application. The memory access identification workflow can begin with sample collection 110, which involves collecting samples 112 during one or more executions of an application. Each sample can include contents of a program counter identifying an address of a currently-executed (sampled) instruction as well as register context for other registers, e.g., the values in the processor registers at the time the samples were collected. Samples 112 can be used to populate a sample data store 114. Samples can be collected on a single device or on multiple devices executing the application.

Memory access identification workflow 100 can also include instruction collection 120, which can include obtaining instructions 122 of the application. The instructions can include sampled instructions, i.e., the instructions at the address identified by the program counter when the samples are collected. The instructions can also include one or more other instructions of the application, e.g., instructions that are in the vicinity of the sampled instructions. The instructions can be used to populate an instruction data store 124. In some cases, the entirety of the application can be obtained, but the disclosed techniques can be employed using only a "window" of instructions around each sampled instruction, as discussed more below. Note that the other instructions of the application do not necessarily need to be obtained during sampling. Rather, instruction collection can be performed before, after, and/or during sampling, and in some cases on a different device than the device that collected the samples.

Memory access identification workflow 100 can also include instruction evaluation 130, which can proceed starting with the sampled register values from the sample data store 114 and the instructions from instruction data store 124 to identify memory accesses 132 using techniques described in detail below. Each memory access can be used to populate a memory access data store 134, such as a log. Once the memory access identification workflow is complete, the memory access data store may include a representative sample of memory accesses by a given application that can be used for various purposes as described elsewhere herein. For instance, developers may manually analyze the memory accesses to understand the memory access traits of the application, and/or automated tools may be used to analyze the memory accesses to determine memory access characteristics of the application, as discussed more below.

Code Example

FIG. 2 illustrates an example code snippet 210 and corresponding sampled register context 220. For the purposes of example, assume that a sample was taken when line 8 of the code snippet was being executed (as shown in bold). Thus, the program counter that is sampled is the address of the lea instruction shown on line 8, and other processor registers have the values shown in FIG. 2 present in the registers when the sample is taken, as indicated by register context 220. The following examples use register names such as RAX, RSI, etc., that are employed by the Intel CPU architecture. However, as discussed more below, the concepts conveyed herein can be readily extended to other CPU and register architectures.

Code snippet 210 includes a window of 7 instructions that occur before line 8 and 7 instructions that occur after line 8, for a total of 15 instructions. Note that a total of 15 instructions are shown for example purposes only and that the disclosed techniques can be employed using any number of instructions of a given a program. In addition, note that nine registers other than the program counter are shown for the purposes of example but that the disclosed techniques can be employed using any number of registers.

The following shows how a single sample can serve as a starting point to iterate both forward and backward through other instructions of an application to identify memory accesses by the application. FIGS. 3A through 3G illustrate forward analysis proceeding from lines 9 through 15 of the code snippet and FIGS. 4A through 4G illustrate backward analysis proceeding from lines 7 through 1 of the code snippet. Prior to iterating through the code in the forward direction, the instruction on line 8, an lea instruction, can be evaluated to change the sampled contents of the R11 register (0x6000) to 0x10070, which is obtained by adding 0x70 to the address stored in the RSP register.

Forward Direction

Figure 3A:
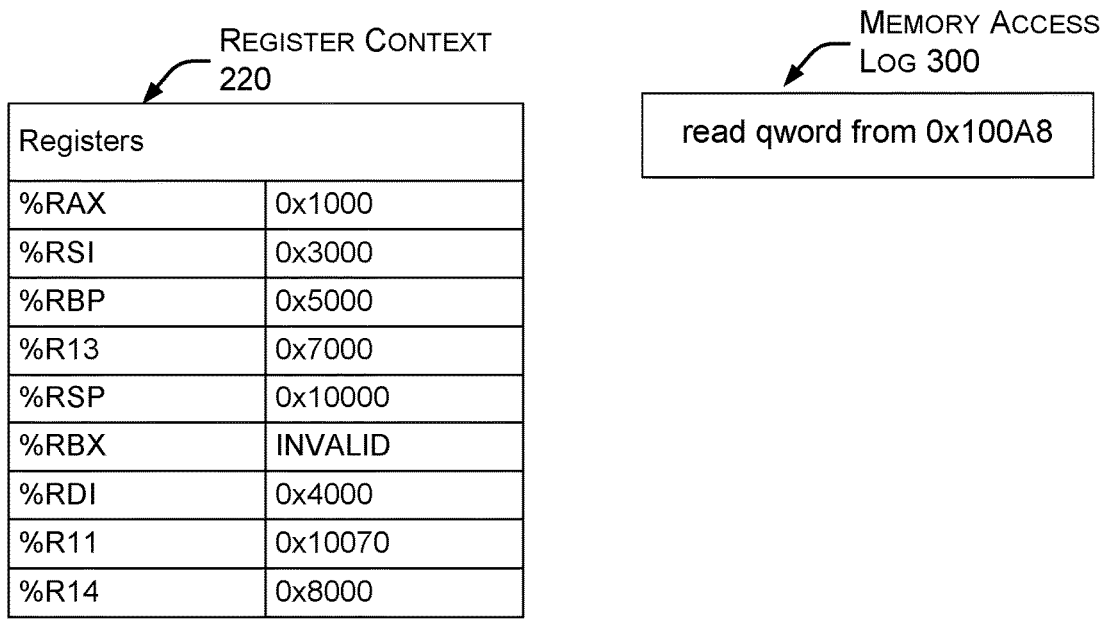
FIGS. 3A-3G illustrate iterating forward through instructions of an application to identify memory accesses based on sampled register values, consistent with some implementations of the present concepts.

Referring to FIG. 3A, instruction evaluation can proceed by moving forward from the sampled lea instruction on line 8. The next instruction on line 9 is a mov instruction that loads an 8-byte quad word from a memory address into the RBX register. The source address can be computed from the operands of the mov instruction using the value in register R11 (0x10070) and the 38 h hex value to arrive at 0x100A8. This memory access is recorded as a quad word memory read at this address, as shown in memory access log 300. In addition, for the purposes of this example, assume that the memory contents of this address are unknown. Thus, the destination RBX register is marked as invalid since it is not known what value is read into RBX from memory address 0x100A8.

Figure 3B:
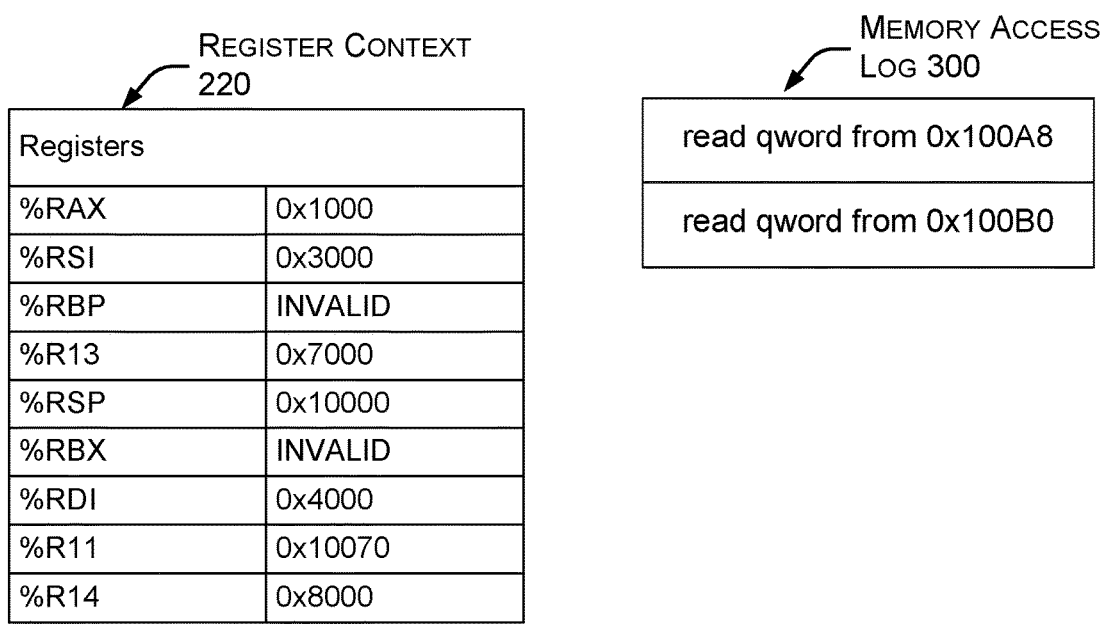

As shown in FIG. 3B, instruction evaluation can proceed by moving forward to line 10, a mov instruction that loads an 8-byte quad word from another memory address into the RBP register. The source address can be calculated from the operands of the mov instruction using the value in register R11 (0x10070) and the 0x40 hex value to arrive at 0x100B0. This memory access is recorded as a quad word memory read at this address, as shown in memory access log 300. Since the memory contents of this address are unknown, the destination RBP register is marked as invalid.

Figure 3C:
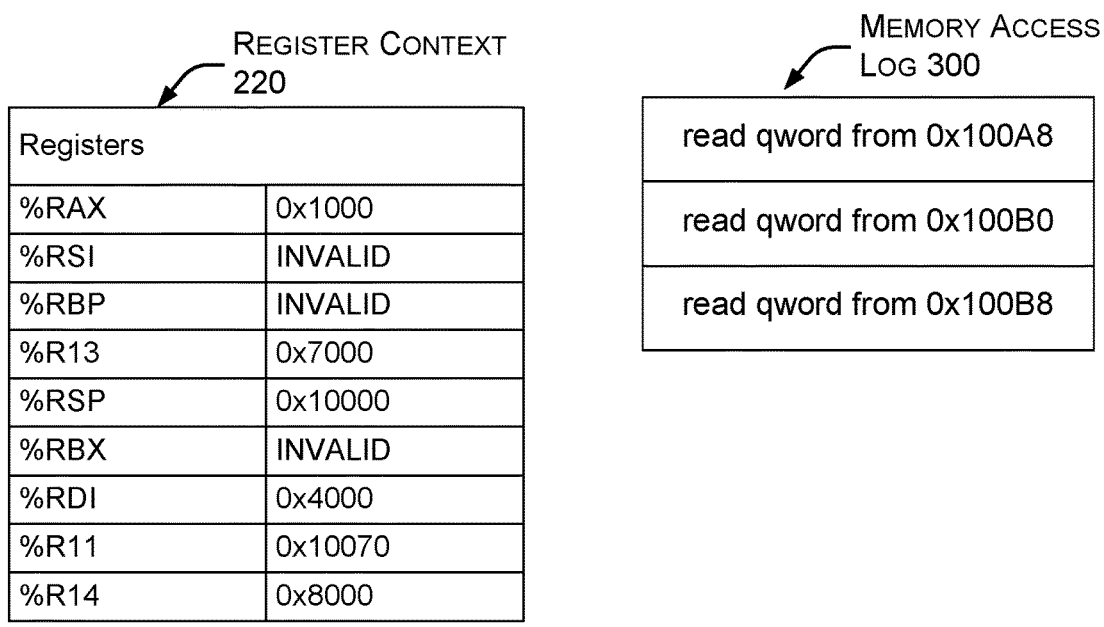

As shown in FIG. 3C, instruction evaluation can proceed by moving forward to line 11, a mov instruction that loads an 8-byte quad word from another memory address into the RSI register. The source address can be computed from the operands of the mov instruction using the value in register R11 (0x10070) and the 0x48 hex value to arrive at Since the memory contents of this address are unknown, the destination RSI register is marked as invalid. A quad word memory access can be recorded at this address as shown in memory access log 300.

Figure 3D:
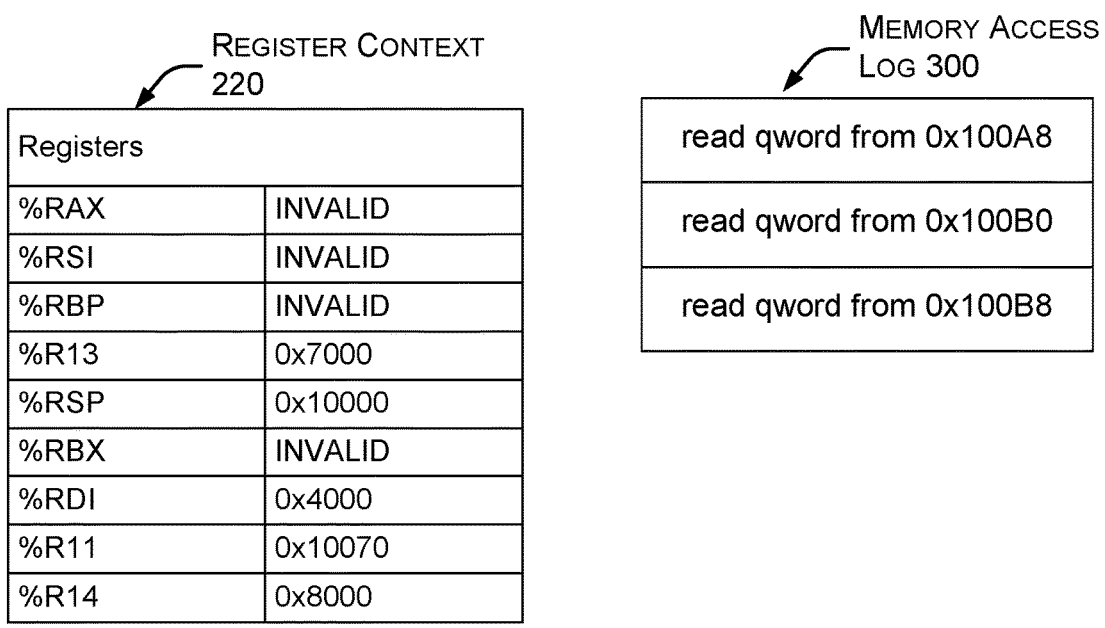

As shown in FIG. 3D, instruction evaluation can proceed by moving forward to line 12, a mov instruction that loads an 8-byte quad word from another memory address into the RAX register. However, in this case, the source address is determined from a value in the RSI register, which is marked as invalid. Thus, no memory access can be inferred. However, the destination RAX register is still marked invalid, as the value in this register may have changed as a result of the mov instruction.

Figure 3E:
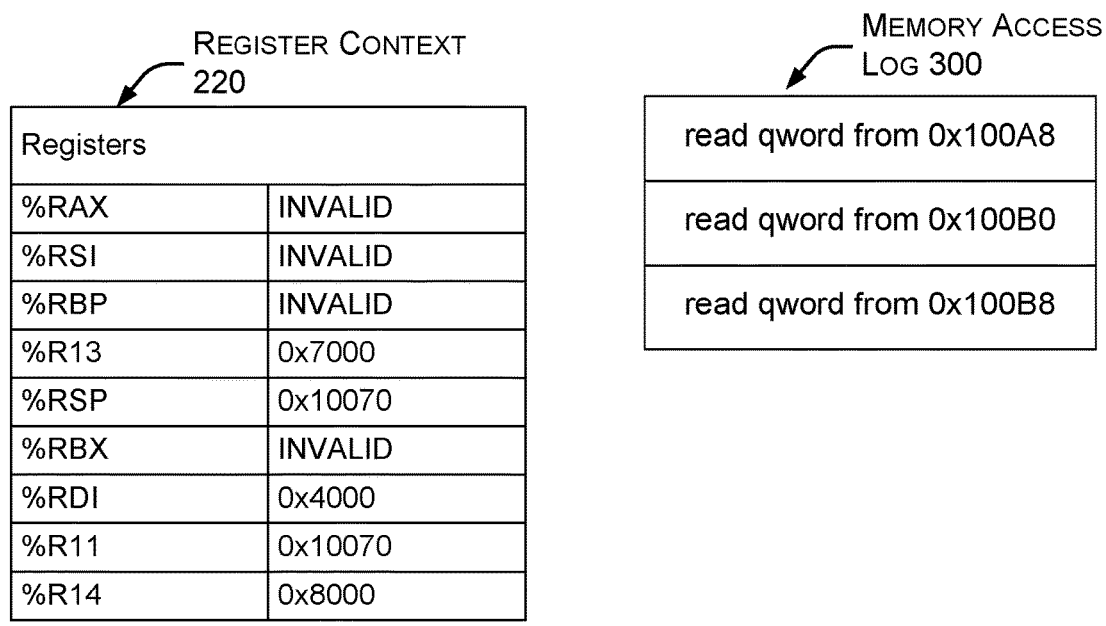

As shown in FIG. 3E, instruction evaluation can proceed by moving forward to line 13, a mov instruction that loads a value from the R11 source register into the RSP destination register. Thus, the value of the RSP register can be updated as shown in FIG. 3E, with no memory access being recorded.

Figure 3F:
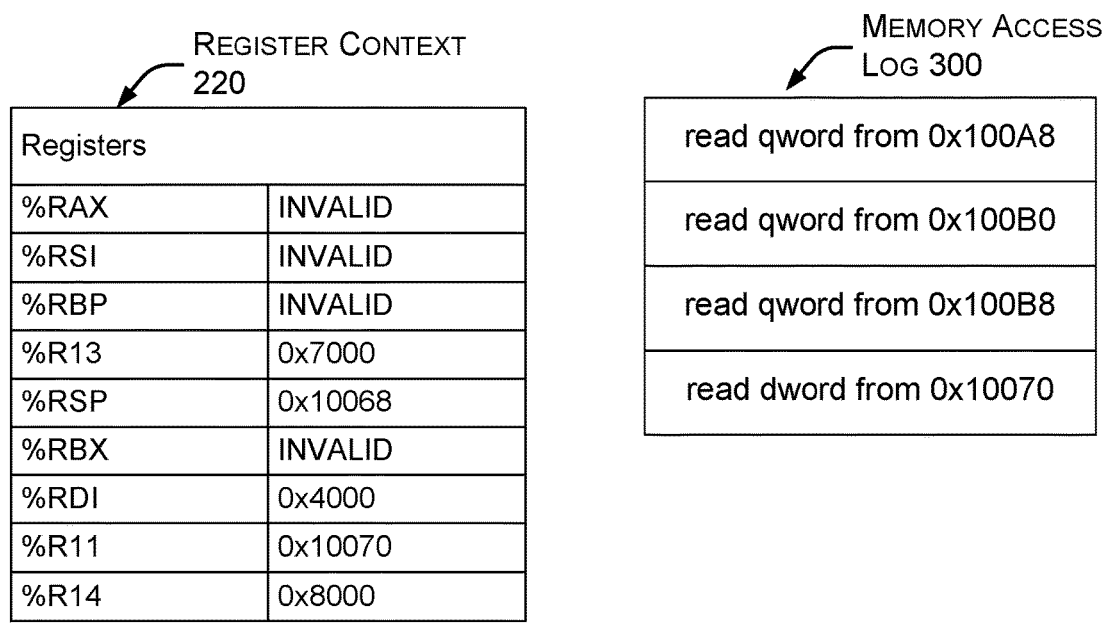

As shown in FIG. 3F, instruction evaluation can proceed by moving forward to line 14, a pop instruction that loads a value into the destination R15 register (not shown) from the source address identified by the stack pointer register RSP, or 0x10070. The pop instruction also updates the stack pointer register RSP to a new value of 0x10068. A memory access reading a double word or four bytes from 0x10070 is recorded.

Figure 3G:
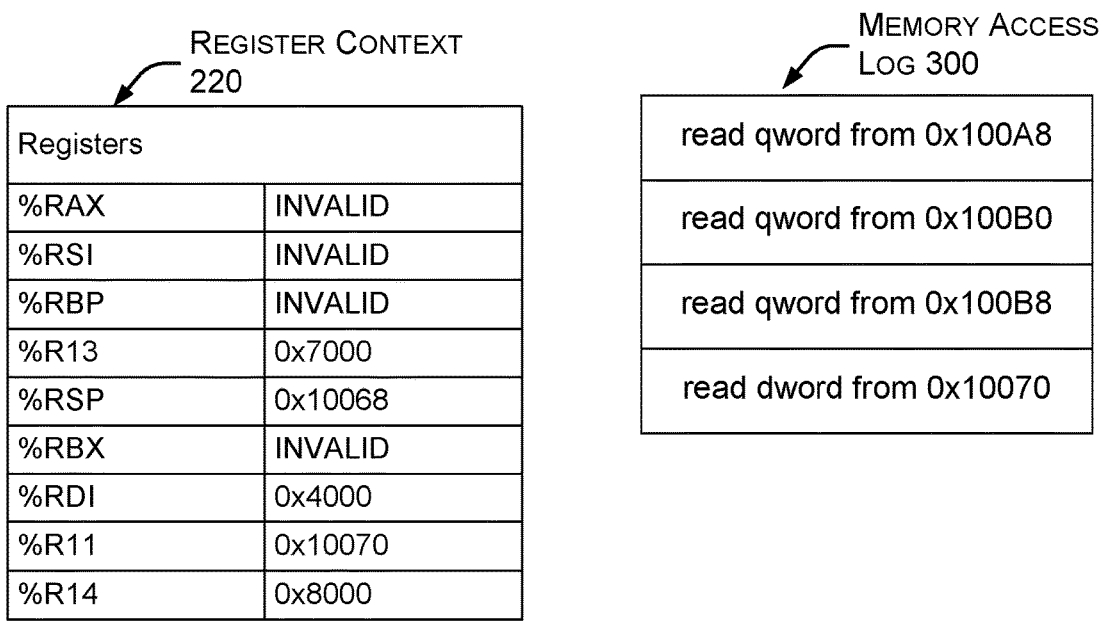

As shown in FIG. 3G, line 15 is a ret instruction, which is a branch instruction that returns to an unspecified calling address. Assume for the purposes of this example that the calling address cannot be determined, and thus the forward evaluation is complete.

Backward Direction

Figure 4A:
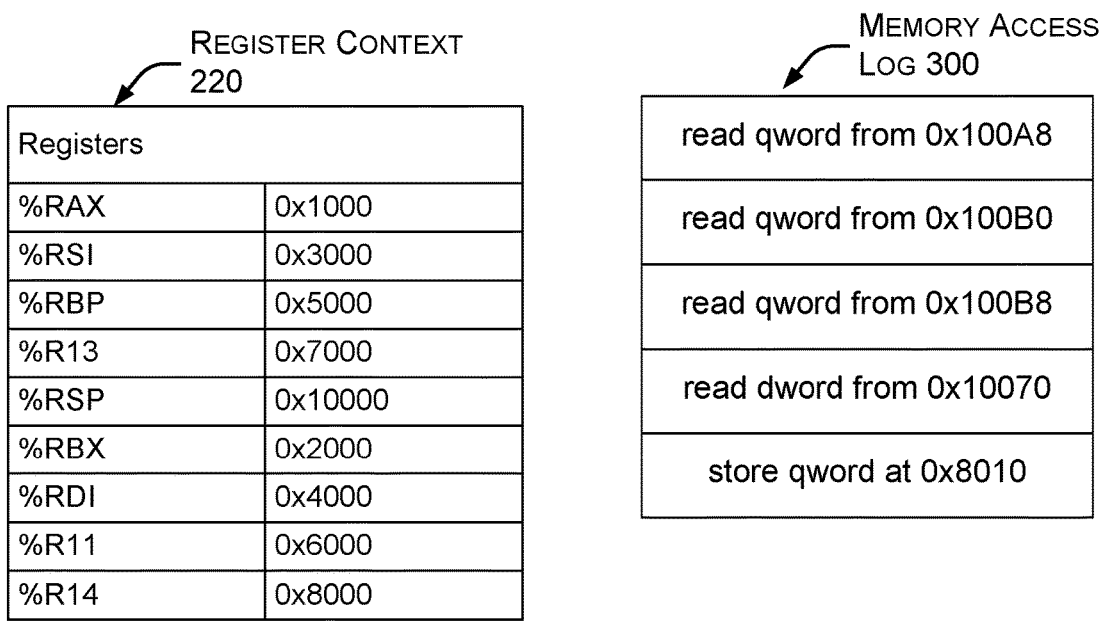
FIGS. 4A-4G illustrate iterating backward through instructions of an application to identify memory accesses based on sampled register values, consistent with some implementations of the present concepts.

The following describes how memory access can be identified in the backward direction. For the following examples, R11 has been restored to a value of 0x6000 as sampled, prior to being modified by line 8 during forward analysis as discussed above. Referring to FIG. 4A, instruction evaluation can proceed by moving backward from the sampled lea instruction on line 8. The preceding instruction on line 7 is a mov instruction that stores an 8-byte quad word from source register RAX into a destination memory address. The destination address can be computed from the operands of the mov instruction using the value in register R14 (0x8000) and the 10 h hex value to arrive at 0x8010. A quad word memory access can be recorded at this address as shown in memory access log 300.

Figure 4B:
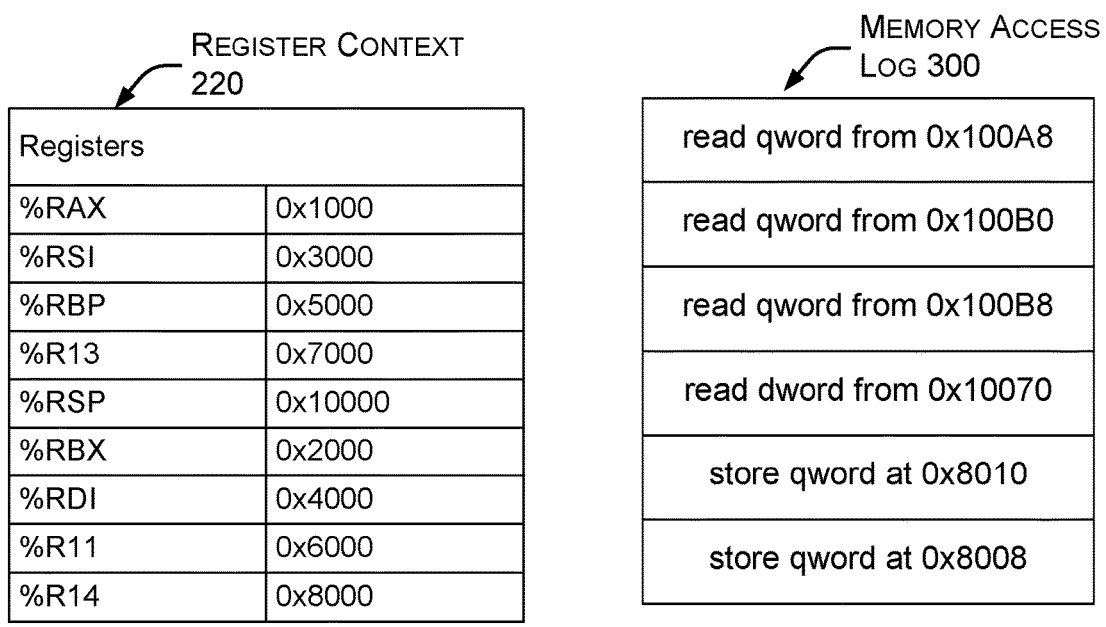

As shown in FIG. 4B, instruction evaluation can proceed by moving backward to line 6, a mov instruction that stores an 8-byte quad word from source register RAX into a destination memory address. The destination address can be computed from the operands of the mov instruction using the value in register R14 (0x8000) and the 8 h hex value to arrive at 0x8008. A quad word memory access can be recorded at this address as shown in memory access log 300.

Figure 4C:
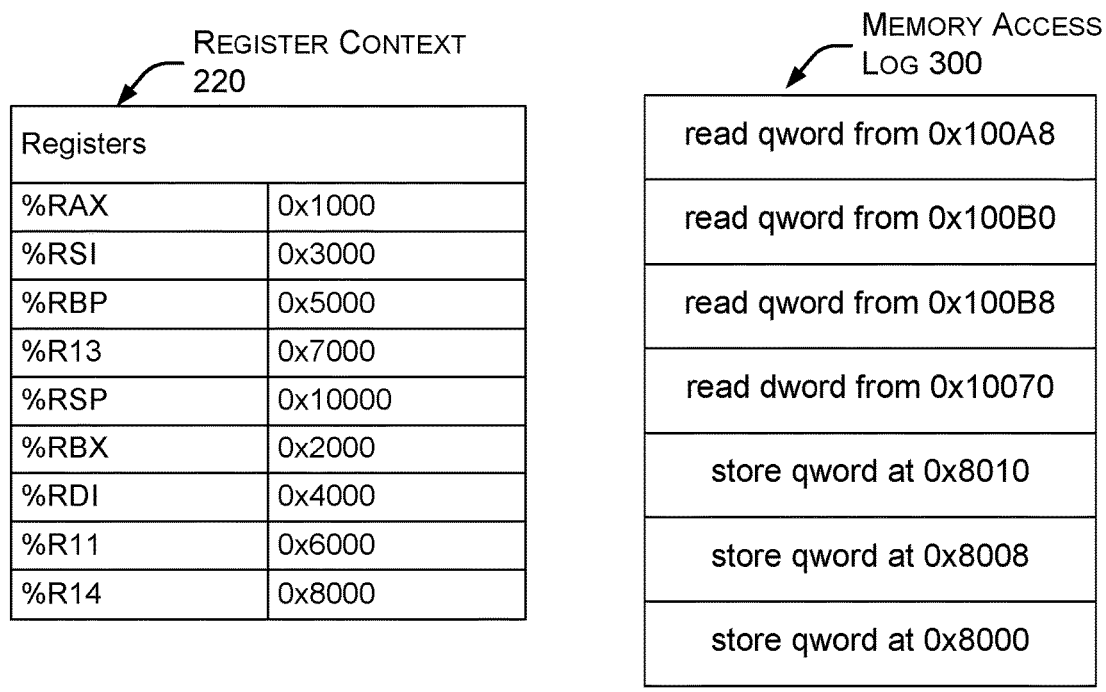

As shown in FIG. 4C, instruction evaluation can proceed by moving backward to line 5, a mov instruction that stores an 8-byte quad word from source register RAX into a destination memory address. The destination address can be computed from the operands of the mov instruction using the value in register R14 (0x8000). A quad word memory access can be recorded at this address as shown in memory access log 300.

Figure 4D:
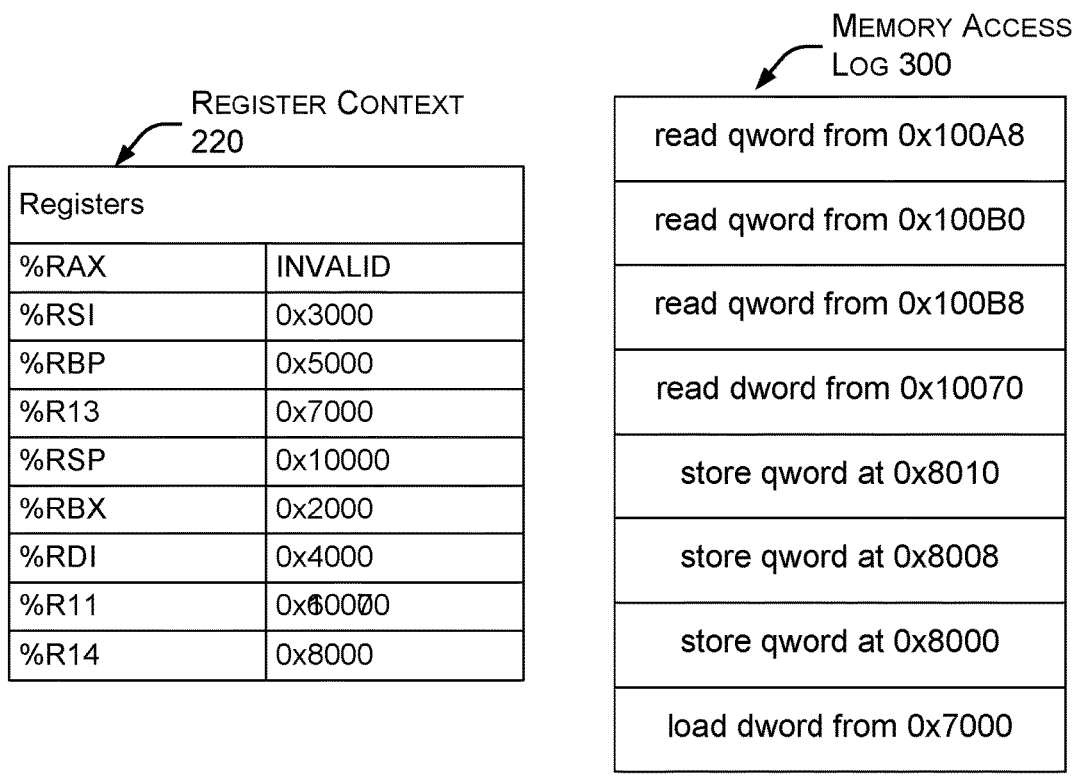

As shown in FIG. 4D, instruction evaluation can proceed by moving backward to line 4, a mov instruction that stores 4 bytes from the source address in register R13 (0x7000) into the RAX destination register. A double word memory access can be recorded at this address as shown in memory access log 300. Since the memory contents of this address are unknown, the RAX register is marked as invalid.

Figure 4E:
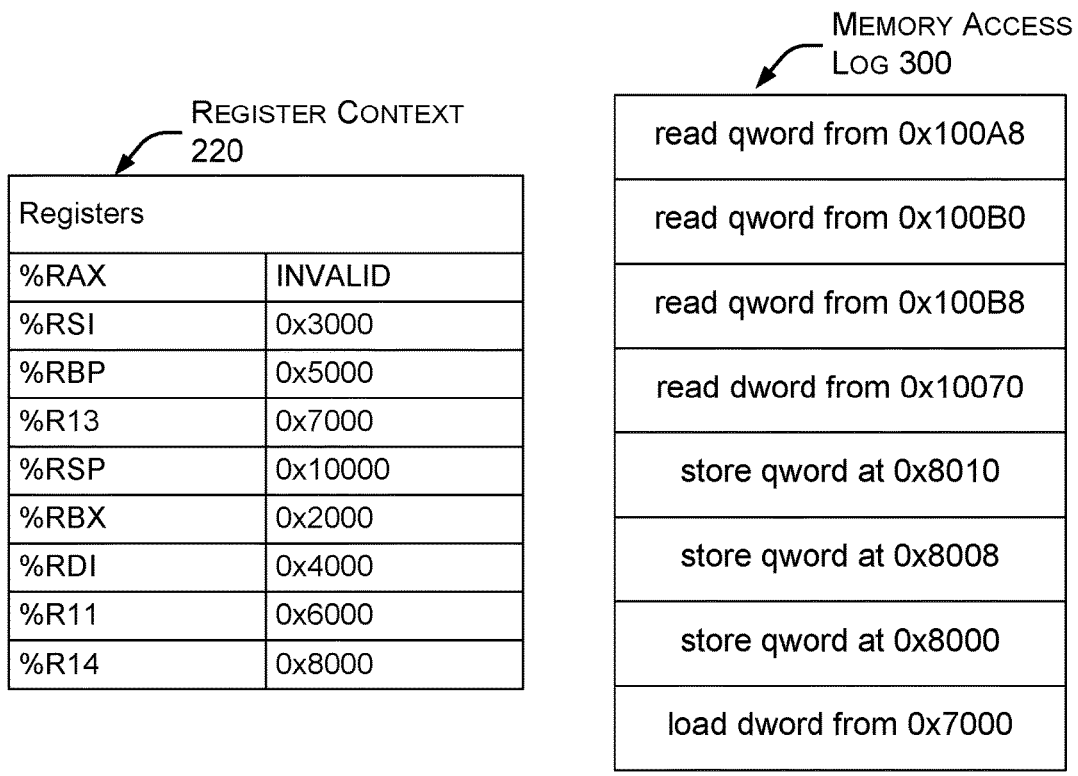

As shown in FIG. 4E, instruction evaluation can proceed by moving backward to line 3, a dec instruction that decrements a value stored in memory at an address obtained by summing values in the RAX and R13 registers. However, the address cannot be identified because RAX is invalid, and thus no memory access is recorded.

Figure 4F:
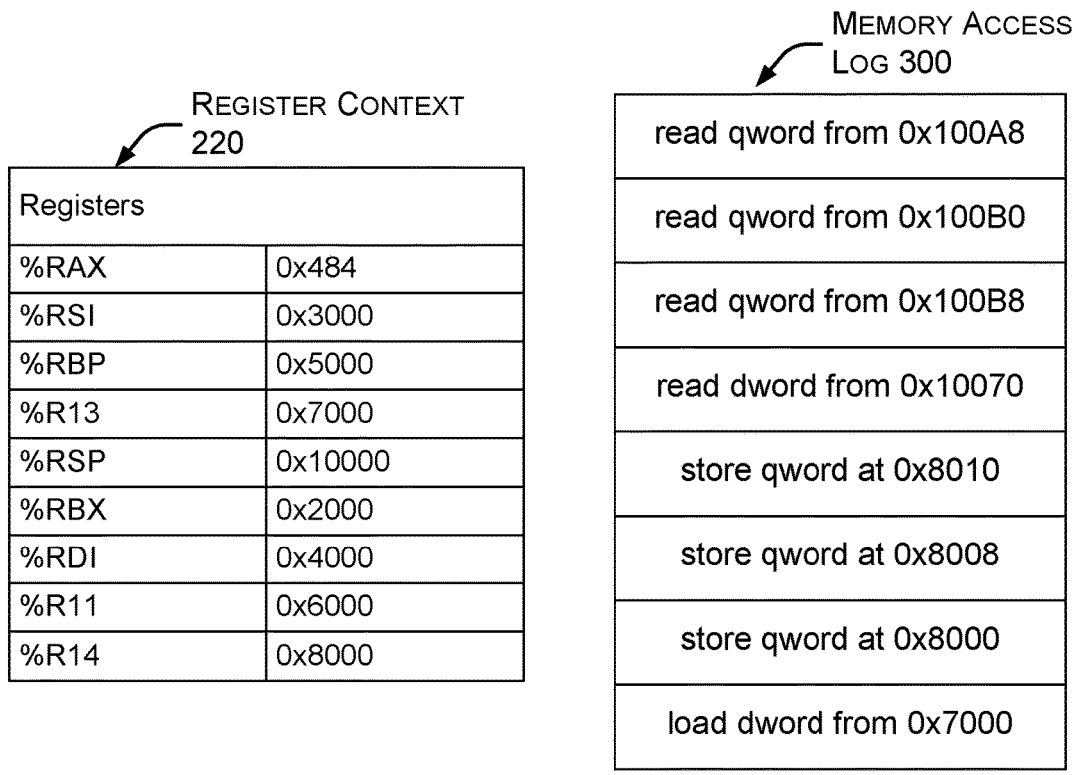

As shown in FIG. 4F, instruction evaluation can proceed by moving backward to line 2, a mov instruction that moves a value of 0x484 into the destination RAX register. No memory access is recorded, and the value of RAX register is updated to 0x484.

Figure 4G:
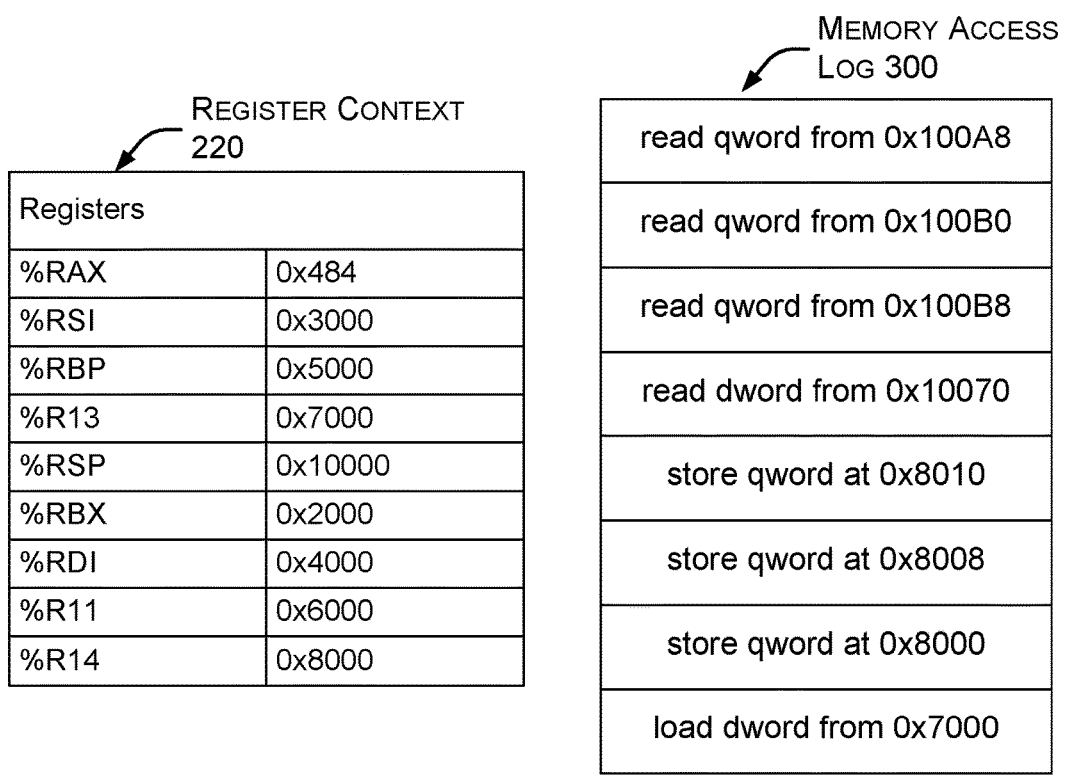

As shown in FIG. 4G, instruction evaluation can proceed by moving backward to line 1, a jmp or jump instruction that branches to another address in the program. This implies that line 2 of the code is the beginning of a basic block, a series of instructions that has no branches and therefore executes straight through. Since the address of the instruction that branched or jumped to line 2 is not known, the algorithm halts at this point.

Specific Forward Direction Evaluation Algorithm

The following provides one specific example of an algorithm that can be employed for forward evaluation of instructions to identify memory accesses. For a given sample, proceed as follows:

1. Identify the currently-evaluated instruction based on the program counter. For the sampled instruction, the program counter will have the value that was recorded when the sample was taken.

2. Analyze the opcode of the currently-evaluated instruction to identify its characteristics (load/store, branch, computation, etc.).
   a. If the currently-evaluated instruction is a computation: attempt to update the register values to emulate the computation. If a computation that modifies a given register cannot be emulated, mark that register as "Invalid".
   b. If the currently-evaluated instruction is a load/store: attempt to compute and record the memory access from the register values as sampled or updated. Do not do so if any of the registers involved in the currently-evaluated instruction are marked as invalid.
   c. If the currently-evaluated instruction is a branch: attempt to determine the branch target based on the register values. If the destination cannot be determined, stop the algorithm.
3. If all registers are marked as invalid, stop the algorithm as no additional memory accesses can be determined.
4. Otherwise, advance the program counter to the next instruction (either the subsequent one or the branch target if the current instruction is a branch) and return to 1.

Specific Backward Direction Evaluation Algorithm

The following provides one specific example of an algorithm that can be employed for backward evaluation of instructions to identify memory accesses. For a given sample, proceed as follows:
1. Identify the currently-evaluated instruction based on the program counter. For the sampled instruction, the program counter will have the value that was recorded when the sample was taken.
2. Analyze the opcode of the currently-evaluated instruction to identify its characteristics (load/store, computation, etc.).
   a. If the currently-evaluated instruction is a computation: mark the destination register of the computation as "invalid".
   b. If the currently-evaluated instruction is a load/store: attempt to compute and record the memory access from the register values as sampled or updated. Do not do so if any of the registers involved in the currently-evaluated instruction are marked as invalid.
   c. Conditional branch instructions are ignored.
3. If all registers are marked as invalid, stop the algorithm as no additional memory accesses can be determined.
4. Otherwise, proceed to the previous program counter until the beginning of a function block or an unconditional branch is reached.

Note that memory accesses can be inferred using either the backward or forward evaluation techniques either together or in isolation. Using either approach individually can generally provide additional information about memory accesses by an application that is not provided by conventional sampling-based techniques.

In addition, note that the forward and backward direction evaluation algorithms described above are specific implementations of the present concepts. Various alternative algorithms can be employed. For instance, as described more below, some implementations may track values stored at individual memory addresses rather than assuming that all values in memory are unknown. Other implementations can consider validity of individual register bytes rather than invalidating entire registers at once, e.g., if a single unknown byte is written to a given register, it does not necessarily follow that the remaining bytes are invalid.

Example System

Figure 5:
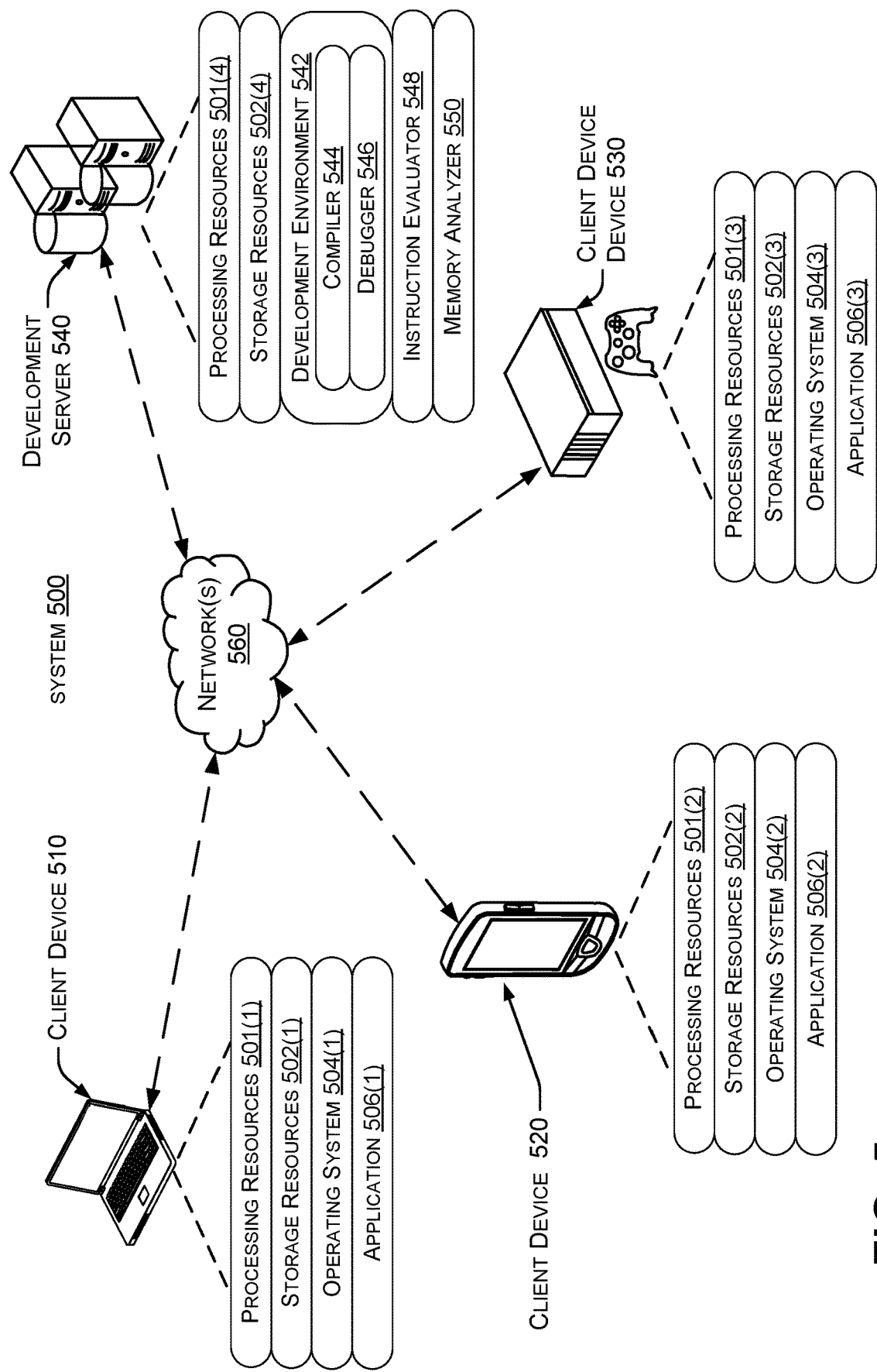
FIG. 5 illustrates an example system, consistent with some implementations of the present concepts.

The present implementations can be performed in various scenarios on various devices. FIG. 5 shows an example system 500 in which the present implementations can be employed, as discussed more below.

As shown in FIG. 5, system 500 includes a client device 510, a client device 520, a client device 530, and a development server 540, connected by one or more network(s) 560. Note that the client devices can be embodied both as mobile devices such as smart phones and/or tablets, as well as stationary devices such as desktops, server devices, etc. Likewise, the servers can be implemented using various types of computing devices. In some cases, any of the devices shown in FIG. 5, but particularly the servers, can be implemented in data centers, server farms, etc.

Certain components of the devices shown in FIG. 5 may be referred to herein by parenthetical reference numbers. For the purposes of the following description, the parenthetical (1) indicates an occurrence of a given component on client device 510, (2) indicates an occurrence of a given component on client device 520, (3) indicates an occurrence of a given component on client device 530, and (4) indicates an occurrence of a given component on development server 540. Unless identifying a specific instance of a given component, this document will refer generally to the components without the parenthetical.

Generally, the devices 510, 520, 530, and/or 540 may have respective processing resources 501 and storage resources 502, which are discussed in more detail below. The devices may also have various modules that function using the processing and storage resources to perform the techniques discussed herein. The storage resources can include both persistent storage resources, such as magnetic or solid-state drives, and volatile storage, such as one or more random-access memory devices. In some cases, the modules are provided as executable instructions that are stored on persistent storage devices, loaded into the random-access memory devices, and read from the random-access memory by the processing resources for execution.

Development server 540 can include a development environment 542 that includes a compiler 544 and a debugger 546. The compiler can compile and link user-edited source code into executable binaries, static libraries, dynamic libraries, etc. The debugger can allow users to step through individual lines of source code to identify programming errors, set breakpoints that halt execution of the application for further evaluation, etc. The development server can also include an instruction evaluator 548, which can identify memory accesses of the application by using sampled register values and application instructions as described previously. Memory analyzer 550 can analyze the memory accesses identified by the instruction evaluator to identify memory access characteristics of the application, such as memory fragmentation characteristics of the application, memory utilization of data objects the application, memory utilization characteristics of functions of the application, or data objects of the application that were not accessed in any of the samples.

Client devices 510, 520, and 530 can each include respective instances of an operating system 504 and an application 506. Application 506 can be developed using the development environment 542 on development server 540. The operating system can sample register context when executing the application and provide the register context to the instruction evaluator 548, which can identify memory accesses by the application as described elsewhere herein. For instance, the operating system and/or application can be configured to periodically report telemetry data to the development server 540, where the telemetry data includes the sampled register values.

Note that FIG. 5 illustrates but one example of a system in which the disclosed concepts can be employed. For instance, in some cases, application development, instruction evaluation to identify memory accesses, and memory utilization analysis can all be performed locally on a single device. In other cases, memory accesses can be identified on a different device than the device used to develop the application. For instance, client devices could include local instances of the instruction evaluator and report memory accesses to the development server as telemetry data, instead of reporting sampled register contents.

Example Memory Analysis Method

Figure 6:
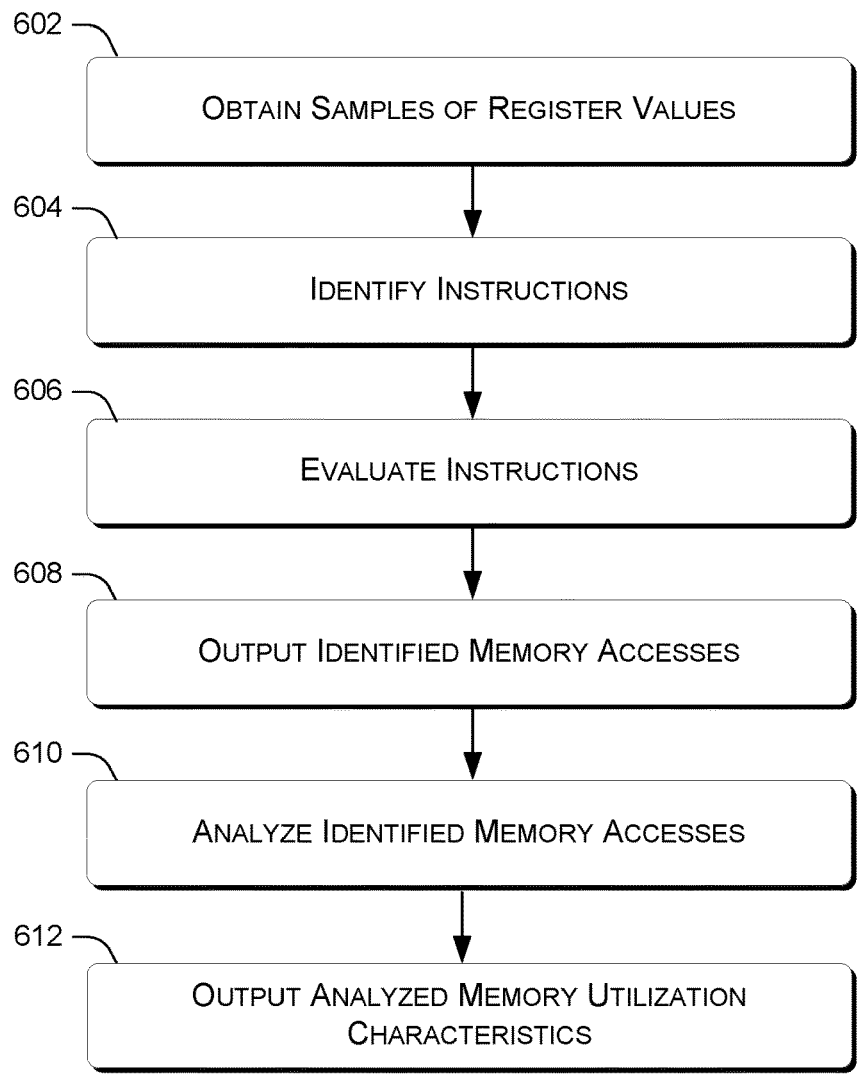
FIG. 6 is a flowchart of an example method for identifying memory access by an application, consistent with some implementations of the present concepts.

FIG. 6 illustrates an example method 600, consistent with some implementations of the present concepts. Method 600 can be implemented on many different types of devices, e.g., by one or more cloud servers, by a client device such as a laptop, tablet, or smartphone, or by combinations of one or more servers, client devices, etc.

Method 600 begins at block 602, where samples are obtained. The samples can be collected when executing an application, and can include sampled register values of a processor. The sampled register values can include an address of a sampled instruction taken from a program counter as well as values present in other registers. In some cases, the samples are received over a network, e.g., as telemetry reported from one or more client devices.

Method 600 continues at block 604, where instructions of the application are obtained. For example, in some cases, a full executable binary of the application is obtained. In other cases, a subset of binary instructions is obtained, e.g., a window of instructions immediately prior and/or subsequent to the sampled instructions. In still further cases, source code, intermediate bytecode, individual binary application libraries or binary objects can be obtained at block 604. The sampled instructions can be identified by the address that was sampled from the program counter. While applications can be loaded at different physical addresses on different machines, the offset of the program counter relative to the base address of the application binary remains consistent and thus this offset can be employed to identify sampled instructions for evaluating as described elsewhere herein.

Method 600 continues at block 606, where the sampled instructions and one or more of the other instructions are evaluated using the sampled register values to identify memory accesses by the application. In some cases, block 606 can involve iterating through the other instructions of the application while updating the sampled register values to obtain updated register values and identifying memory accesses based at least on the other instructions and the sampled register values or the updated register values. In some cases, individual registers can be marked as invalid based on register invalidity criteria, such as when instructions load registers from memory or from other registers previously designated as invalid.

Method 600 continues at block 608, where the identified memory accesses are output. For instance, the memory accesses can be output to a data store such as a memory access log, communicated over a network to another device, displayed to a developer on a display device, etc.

Method 600 continues at block 610, where the identified memory accesses are analyzed to determine memory access characteristics of the application. For instance, block 610 can involve identifying memory fragmentation characteristics of the application, memory utilization of data objects the application, memory utilization characteristics of functions of the application, or data objects of the application that were not accessed.

Method 600 continues at block 612, where the memory access characteristics are output. For instance, as described more below, the memory access characteristics can be output via a graphical user interface to an application developer for debugging purposes, can be used to automatically identify and alter developers to memory utilization errors by the application, can be used as hints to a garbage collector for the application, etc.

Note that certain portions of method 600 can be performed independently while omitting other portions of the method. For instance, consider blocks 602, 604, 606, and 608, which, when performed, result in identified memory accesses by an application. Blocks 610 and/or 612 can optionally be omitted, as a developer or other individual could employ the individual memory accesses output by block 608 to infer program behaviors and make corresponding changes to the application without necessarily having performed blocks 610 and/or 612 before doing so. Likewise, a developer or other entity could provide a set of memory accesses such as those output at block 608 to a memory analyzer to perform blocks 610 and/or 612 as described herein. Such an entity could obtain the memory accesses from another entity that performed blocks 602 through 608.

Blocks 602, 604, 606, and 608 of method 600 can be performed by instruction evaluator 548. In some cases, the instruction evaluator can perform the specific forward and backward direction evaluation algorithms described above, although other implementations are contemplated and within the scope of the concepts described herein. Blocks 610 and 612 of method 600 can be performed by memory analyzer 550.

Example Graphical Interfaces

Figure 7:
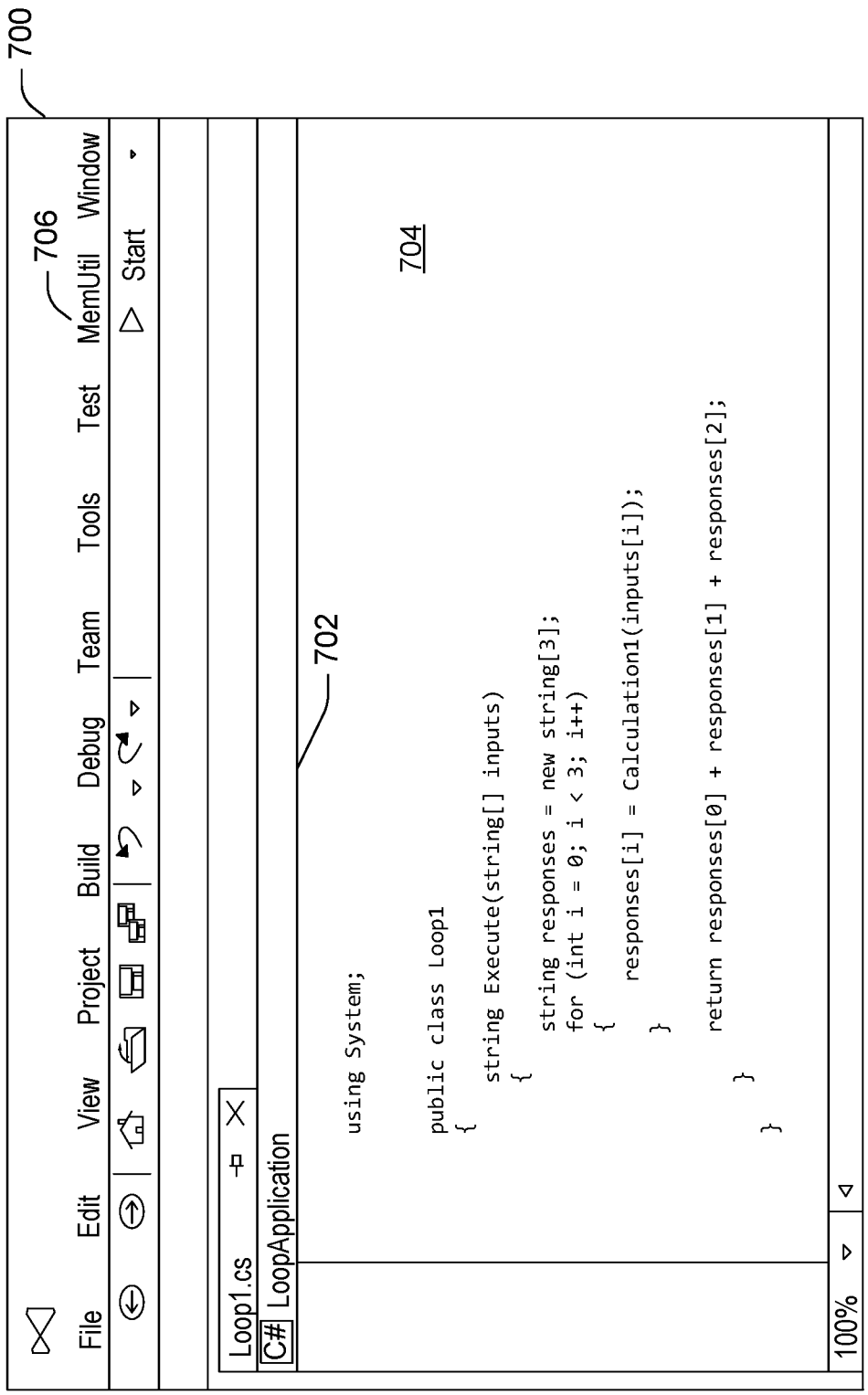
FIG. 7 illustrates an example graphical user interface for an integrated development environment, consistent with some implementations of the present concepts.

FIG. 7 illustrates a development environment interface 700 with a code editor 702 that can be used to enter source code 704 for a program. Note that the source code shown in FIG. 7 is representative and does not necessarily correspond to the example binary or assembly instructions discussed above. The development environment interface can include a selectable memory utilization element 706 that can be used by a developer to configure memory utilization analysis.

FIG. 8 illustrates an example configuration graphical user interface ("GUI") 800 that can be presented when a user selects the memory utilization element 706 from development environment interface 700. The configuration graphical user interface can include user-selectable elements for configuring sampling-based identification of memory accesses as described herein. For example, sampling basis element 801 provides an option for selecting a sampling basis, e.g., sampling based on time, number of instructions executed, etc. Here, the user has elected to sample based on time period. Sampling interval element 802 provides options for selecting a sampling interval. Here, the user has elected to sample every 10 milliseconds, but other options can be provided such as every 100 milliseconds, every second, every minute, every 10000 cache misses, etc. Had the user selected instruction-based sampling instead, the user could specify a number of instructions per sample, e.g., sample every 1000 instructions, sample every 10,000 instructions, etc.

Sampling start element 803 allows the user to specify a start date or time at which to begin sampling the application. Sampling end element 804 allows the user to specify an end date or time at which to cease collecting samples. Sample path element 805 specifies a path where samples are to be stored, e.g., when collected from the client devices. Code path element 806 specifies a path where code is stored, e.g., where a binary representation of the deployed application can be found. Submit button 807 allows a user to communicate memory analysis configuration settings to the development server 540. The development server can communicate instructions to each client device that causes the operating system and/or application to collect samples according to the sampling configuration.

FIG. 9 illustrates an example memory analysis results output GUI 900. The memory analysis results output GUI can convey any identified memory access characteristics of the application. For instance, one memory access characteristic can relate to overall memory fragmentation of the application, e.g., the percentage of unused space in the memory pages allocated to the application. The memory analysis results output GUI can also convey the data objects in the application that use the most memory, e.g., the three largest data objects are shown in FIG. 9. The memory analysis results output GUI can also convey the memory utilization of individual application functions, e.g., the three most memory-intensive functions are shown in FIG. 9. The memory analysis results output GUI can also convey any data objects that are not accessed when evaluating any of the samples, e.g., three data objects that are not accessed are shown in FIG. 9. In some cases, stack memory usage can be distinguished from heap memory usage using a specific register that contains the address of the stack, or identifying a specific memory range dedicated to the stack. In either case, developers can also be provided with information characterizing stack and heap memory utilization by the application.

Also note that the memory analysis results output GUI 900 can indicate certain information about the sampling that was performed to determine the memory analysis results. For instance, the memory analysis results output GUI can indicate how many samples were taken, when the samples were taken, how many client devices reported samples, etc. In some cases, statistical bounds on memory utilization can be inferred based on the number of samples taken, and the statistical bounds can be reported to a user. For instance, some implementations can report a $90^{th}$ percentile confidence interval for fragmentation (e.g., 30%-34%) instead of a single value as shown in FIG. 9. This is also true for memory utilization of data objects and functions.

Further Implementation Details

One way to implement sampling is to configure the application for in-process sampling. For instance, the application code can be linked together with a sampling library to obtain an executable binary. The sampling library can include instructions that cause the register contents of the processor to be stored off at specified sampling intervals. In this case, the application can be distributed by the development server 540 to the client devices with internal sampling functionality that can execute without modifying any external code, which can be useful for minimizing any burdensome impacts on end users.

In other cases, an out-of-process profiler is employed. For instance, an operating system or CPU can be configured to interrupt the application at specified sampling intervals. When the interrupt occurs, the operating system can store off the register values present in the processor and then return control to the application. In this case, the development server 540 can communicate instructions to the local operating system instances on each client device that configure the operating system to sample the application as instructed.

Irrespective of whether in-process or out-of-process sampling is performed, the obtained samples can be used to identify memory accesses as described previously. Note that the above examples involve several simplifying assumptions. First, the above examples assume that the contents of memory are not known. However, the disclosed concepts can also leverage information about memory contents to continue iterating through certain instructions.

As one specific example, consider a first instruction that stores a value from a valid source register (e.g., RAX) to a destination memory address, and then a second instruction that reads the contents of that address into another register (e.g., R13) Assuming the two instructions are immediately adjacent in the code or that no intervening instructions modify that memory address, the value written to the memory from the RAX register could be used to populate the R13 register when evaluating the second instruction.

However, some technical environments preclude or at least make it difficult to be certain whether memory contents can be presumed valid even when the application code itself does not include intervening instructions that modify memory. For instance, in a multi-threaded device, it is not necessarily true that memory is not modified between two adjacent instructions, because the operating system could perform a context switch to another thread after the first instruction, that thread could modify the same memory address indicated by the contents of the RAX register, and then the R13 register would instead read the contents written by the other thread. Thus, marking R13 as invalid is one safe way to proceed.

However, consider a device that does not support multi-threading. In this case, R13 can be safely populated with the value from RAX to continue evaluating instructions and potentially identifying further memory accesses, because there are no other threads on the device that can modify memory. As another example, consider a critical code segment that is protected by a lock, semaphore, mutex, or other synchronization construct that ensures sequential execution of instructions within that critical code segment in multi-threaded environments. It may be possible to safely assume that R13 will be populated with the value from RAX under these circumstances as well.

The previous examples also make the simplifying assumption that certain control flow target addresses are not known. For instance, referring to FIG. 3G above, the previous example assumed that the calling address of the ret instruction is not known. Thus, the previous example ceases iterating through the instructions responsive to encountering the ret control flow instruction.

However, in some cases, calling addresses may be available from other sources (e.g., sampled stack memory or register values), and evaluation can proceed by using the instructions present at the calling addresses. This can also be true for jump targets such as those described above with respect to FIG. 4G.

The previous examples also make the simplifying assumption that entire registers are invalidated at once. However, in some cases, registers may be partially invalidated, depending on the specific instruction being evaluated. For instance, if a single byte is loaded from memory into the second byte of a four-byte (32-bit) register, then the second byte of that register can be marked invalid while the remaining bytes can be tracked separately. As another example, the instruction mov AL, 10 h would overwrite the lower 8 bits of the RAX register on an x86 machine, and the remaining bits can remain valid. In some cases, the prefix of a given instruction can convey the number of bytes that are operated on by that instruction.

In addition, the previous examples also employ x86 examples with the simplifying assumption that each instruction includes only two operands. However, some instruction sets may allow more than two operands. The disclosed techniques can be readily extended to such instruction sets, e.g., Advanced RISC Machines or ARM instruction sets. The disclosed techniques can be employed to infer memory access characteristics of applications executing on any logic circuit that executes a stream of instructions, such as a graphics processing unit, field-programmable gate array, application-specific integrated circuit, neural processing unit, etc.

Technical Effect

The disclosed implementations offer several advantages over conventional techniques for memory access profiling. Conventional memory profiling approaches generally do not utilize register context to infer the memory accesses of an application. However, when an application is sampled by the operating system, the register context is readily available to the operating system without modification. For instance, when an application is interrupted by the CPU or the operating system and a sample is taken, the operating system records the register state for the context switch to the operating system so that the register state can be restored for a subsequent context switch back to the application. Thus, the register values described herein are readily accessible when an operating system interrupts an application to take a sample. As a consequence, the disclosed techniques can be employed without necessarily modifying the operating system to collect additional information when sampling a given application. Instead, the operating system can simply record the register values that it collects to facilitate the context switch.

Further, recall that sampling based on specific hardware supporting features, such as Intel PEBS or AMD IBS, tends to identify only the memory accesses that are made by sampled instructions. In some cases, the sampled instructions do not access memory at all. Even when a sampled instruction does perform a memory access, the instruction will typically access a single memory address, it follows that each sample taken using these supporting hardware features typically identifies a single memory access. In contrast, refer back to FIG. 4G and note that eight different memory accesses are identified from a single sample. By iterating forward and backward through other application instructions using sampled register values, the disclosed implementations can greatly expand the amount of useful information that can be derived from a single sample. Moreover, the disclosed implementations can identify these memory accesses without necessarily having specific supporting hardware or software such as Intel PEBS or AMD IBS.

By extracting additional memory access information from each sample, several technical effects are achieved. First, fewer total samples are needed to obtain an equivalent amount of information, e.g., a sampling profiler using supporting hardware would need to take at least eight separate samples to extract the same amount of information obtained using only a single sample in the example described previously. Each sample involves a certain amount of computational resources, e.g., processor cycles and memory are consumed by interrupting the application to take a sample. Thus, evaluating samples as described herein can reduce the number of processor cycles and memory employed to identify memory access by an application.

In addition, note that each separate memory access potentially corresponds to a different function or data object in a given application. Thus, consider a developer that wants to know whether a particular data object is ever accessed in production environments. Even if that data object is never accessed by a sampled instruction, the disclosed implementations can still be used to infer that the data object is accessed by other instructions. In other words, the samples do not need to "catch" the data object being accessed by a particular sampled instruction in memory, they only need to capture an instruction from which a memory access to that data object can be reached by iterating through other instructions and updating register values as described previously.

Furthermore, the disclosed techniques are not limited to any specific hardware support or operating support. While some modern processors provide hardware support for sampling of memory accesses, these hardware-based techniques generally require not only hardware with those features, but operating system code that supports using those features. The disclosed implementations can be used to infer memory accesses using samples taken on devices that lack such hardware or operating system support.

Device Implementations

As noted above with respect to FIG. 5, system 500 includes several devices, including a client device 510, a client device 520, a client device 530, and a development server 540. As also noted, not all device implementations can be illustrated, and other device implementations should be apparent to the skilled artisan from the description above and below.

The term "device", "computer," "computing device," "client device," and or "server device" as used herein can mean any type of device that has some amount of hardware processing capability and/or hardware storage/memory capability. Processing capability can be provided by one or more hardware processors (e.g., hardware processing units/cores) that can execute computer-readable instructions to provide functionality. Computer-readable instructions and/or data can be stored on storage, such as storage/memory and or the datastore. The term "system" as used herein can refer to a single device, multiple devices, etc.

Storage resources can be internal or external to the respective devices with which they are associated. The storage resources can include any one or more of volatile or non-volatile memory, hard drives, flash storage devices, and/or optical storage devices (e.g., CDs, DVDs, etc.), among others. As used herein, the term "computer-readable media" can include signals. In contrast, the term "computer-readable storage media" excludes signals. Computer-readable storage media includes "computer-readable storage devices." Examples of computer-readable storage devices include volatile storage media, such as RAM, and non-volatile storage media, such as hard drives, optical discs, and flash memory, among others.

In some cases, the devices are configured with a general-purpose hardware processor and storage resources. In other cases, a device can include a system on a chip (SOC) type design. In SOC design implementations, functionality provided by the device can be integrated on a single SOC or multiple coupled SOCs. One or more associated processors can be configured to coordinate with shared resources, such as memory, storage, etc., and/or one or more dedicated resources, such as hardware blocks configured to perform certain specific functionality. Thus, the term "processor," "hardware processor" or "hardware processing unit" as used herein can also refer to central processing units (CPUs), graphical processing units (GPUs), controllers, microcontrollers, processor cores, or other types of processing devices suitable for implementation both in conventional computing architectures as well as SOC designs.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

In some configurations, any of the modules/code discussed herein can be implemented in software, hardware, and/or firmware. In any case, the modules/code can be provided during manufacture of the device or by an intermediary that prepares the device for sale to the end user. In other instances, the end user may install these modules/code later, such as by downloading executable code and installing the executable code on the corresponding device.

Also note that devices generally can have input and/or output functionality. For example, computing devices can have various input mechanisms such as keyboards, mice, touchpads, voice recognition, gesture recognition (e.g., using depth cameras such as stereoscopic or time-of-flight camera systems, infrared camera systems, RGB camera systems or using accelerometers/gyroscopes, facial recognition, etc.). Devices can also have various output mechanisms such as printers, monitors, etc.

Also note that the devices described herein can function in a stand-alone or cooperative manner to implement the described techniques. For example, the methods and functionality described herein can be performed on a single computing device and/or distributed across multiple computing devices that communicate over network(s) 560. Without limitation, network(s) 560 can include one or more local area networks (LANs), wide area networks (WANs), the Internet, and the like.

Various examples are described above. Additional examples are described below. One example includes a method comprising obtaining samples collected when executing an application, the samples comprising sampled register values that were present in one or more registers of a processor when the samples were collected, identifying sampled instructions of the application that were executing when the samples were collected and other instructions of the application, evaluating the sampled instructions and one or more of the other instructions using the sampled register values to identify memory accesses by the application, and outputting the identified memory accesses.

Another example can include any of the above and/or below examples where the outputting comprises outputting memory addresses of the identified memory accesses and memory sizes that were accessed by the identified memory accesses.

Another example can include any of the above and/or below examples where the method further comprises identifying the sampled instructions that were executing when the samples were taken based at least on contents of a program counter.

Another example can include any of the above and/or below examples where the evaluating comprises iterating through the other instructions, updating individual register values based at least on the other instructions and the sampled register values, identifying individual memory accesses based at least on the updated individual register values, and storing the individual memory accesses in a memory access log.

Another example can include any of the above and/or below examples where the iterating being performed in a backward direction over multiple previous instructions occurring in the application prior to the sampled instructions and in a forward direction over multiple subsequent instructions occurring in the application after the sampled instructions.

Another example can include any of the above and/or below examples where the evaluating comprises marking individual registers as invalid according to one or more register invalidity criteria.

Another example can include any of the above and/or below examples where the one or more register invalidity criteria relate to instructions that load the individual registers from memory.

Another example can include any of the above and/or below examples where the one or more register invalidity criteria relate to instructions that compute register values for the individual registers from other registers previously designated as invalid.

Another example can include any of the above and/or below examples where the method further comprises configuring a garbage collector based at least on the identified memory accesses.

Another example can include any of the above and/or below examples where the method further comprises identifying memory utilization of at least one function or data object in the application based at least on the identified memory accesses.

Another example can include any of the above and/or below examples where the method further comprises characterizing memory fragmentation of the application based at least on the identified memory accesses.

Another example includes a processor and a storage medium storing instructions which, when executed by the processor, cause the system to: obtain samples collected when executing an application, the samples comprising sampled register values, obtain application code of the application, the application code including sampled instructions that were executing when the samples were taken and other instructions of the application, iterate through the sampled instructions and the other instructions of the application while updating the sampled register values to obtain updated register values, identify memory accesses based at least on the other instructions and the sampled register values or the updated register values, and output the memory accesses.

Another example can include any of the above and/or below examples where the instructions, when executed by the processor, cause the system to calculate addresses of the memory accesses based at least on the sampled register values or the updated register values.

Another example can include any of the above and/or below examples where the instructions, when executed by the processor, cause the system to cease iterating through the other instructions responsive to encountering a control flow instruction.

Another example can include any of the above and/or below examples where the instructions, when executed by the processor, cause the system to receive the samples via telemetry data reported from a plurality of client devices that execute the application locally.

Another example includes a computer-readable storage medium storing instructions which, when executed by a computing device, cause the computing device to perform acts comprising: receiving user input specifying a sampling configuration for an application, configuring sampling of the application according to the sampling configuration, obtaining samples collected when executing the application according to the sampling configuration, the samples comprising sampled register values of a processor when the samples were collected, and identifying memory access characteristics of the application by analyzing the sampled register values, sampled instructions that were executing when the samples were collected, and other instructions of the application.

Another example can include any of the above and/or below examples where the acts further comprise displaying a graphical user interface comprising user-selectable elements for specifying the sampling configuration and receiving the user input via the graphical user interface.

Another example can include any of the above and/or below examples where the graphical user interface having user-selectable elements for specifying sampling intervals by time period or by number of instructions.

Another example can include any of the above and/or below examples where the acts further comprise displaying a graphical user interface that conveys the identified memory access characteristics.

Another example can include any of the above and/or below examples where the graphical user interface identifying at least one of memory fragmentation characteristics of the application, memory utilization of data objects the application, memory utilization characteristics of functions of the application, or data objects of the application that were not accessed.

CONCLUSION

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and other features and acts that would be recognized by one skilled in the art are intended to be within the scope of the claims.

The invention claimed is:

1. A method comprising:
obtaining samples collected when executing an application, the samples comprising sampled register values that were present in one or more registers of a processor other than a program counter when the samples were collected, the sampled register values being collected from the one or more registers other than the program counter after a context switch from the application to an operating system that recorded the sampled register values;
identifying sampled instructions of the application that were executing when the samples were collected and other instructions of the application;
evaluating the sampled instructions and one or more of the other instructions using the sampled register values to identify memory accesses by the application; and
storing the identified memory accesses in a memory access log.

2. The method of claim 1, wherein the storing comprises storing, in the memory access log, memory addresses of the identified memory accesses and memory sizes that were accessed by the identified memory accesses.

3. The method of claim 1, further comprising:
identifying the sampled instructions that were executing when the samples were taken based at least on contents of the program counter, the sampled register values further including the contents of the program counter.

4. The method of claim 3, wherein the evaluating comprises iterating through the other instructions, updating individual register values based at least on the other instructions and the sampled register values, identifying individual memory accesses based at least on the updated individual register values, and storing the individual memory accesses in the memory access log.

5. The method of claim 4, the iterating being performed in a backward direction over multiple previous instructions occurring in the application prior to the sampled instructions and in a forward direction over multiple subsequent instructions occurring in the application after the sampled instructions.

6. The method of claim 1, wherein the evaluating comprises marking individual registers as invalid according to one or more register invalidity criteria.

7. The method of claim 6, wherein the one or more register invalidity criteria relate to instructions that load the individual registers from memory.

8. The method of claim 7, wherein the one or more register invalidity criteria relate to instructions that compute register values for the individual registers from other registers previously designated as invalid.

9. The method of claim 1, further comprising:
configuring a garbage collector based at least on the identified memory accesses.

10. The method of claim 1, further comprising:
identifying memory utilization of at least one function or data object in the application based at least on the identified memory accesses.

11. The method of claim 1, further comprising:
characterizing memory fragmentation of the application based at least on the identified memory accesses.

12. A system comprising:
a processor; and
a storage medium storing instructions which, when executed by the processor, cause the system to:
obtain samples collected when executing an application, the samples comprising sampled register values that were present in one or more registers of a processor other than a program counter when the samples were collected, the sampled register values being collected from the one or more registers other than the program counter after a context switch from the application to an operating system that recorded the sampled register values;
obtain application code of the application, the application code including sampled instructions that were executing when the samples were taken and other instructions of the application;
iterate through the sampled instructions and the other instructions of the application while updating the sampled register values to obtain updated register values;
identify memory accesses based at least on the other instructions and the sampled register values or the updated register values; and
store the memory accesses in a memory access log.

13. The system of claim 12, wherein the instructions, when executed by the processor, cause the system to:

calculate addresses of the memory accesses based at least on the sampled register values or the updated register values.

14. The system of claim 13, wherein the instructions, when executed by the processor, cause the system to:
cease iterating through the other instructions responsive to encountering a control flow instruction.

15. The system of claim 12, wherein the instructions, when executed by the processor, cause the system to:
receive the samples via telemetry data reported from a plurality of client devices that execute the application locally.

16. A computer-readable storage medium storing instructions which, when executed by a computing device, cause the computing device to perform acts comprising:
receiving user input specifying a sampling configuration for an application;
configuring sampling of the application according to the sampling configuration;
obtaining samples collected when executing the application according to the sampling configuration, the samples comprising sampled register values that were present in one or more registers of a processor other than a program counter when the samples were collected, the sampled register values being collected from the one or more registers other than the program counter after a context switch from the application to an operating system that recorded the sampled register values;
evaluating the samples to identify memory accesses by the application;
storing the identified memory accesses in a memory access log; and
identifying memory access characteristics of the application by analyzing the identified memory accesses in the memory access log.

17. The computer-readable storage medium of claim 16, the acts further comprising:
displaying a graphical user interface comprising user-selectable elements for specifying the sampling configuration; and
receiving the user input via the graphical user interface.

18. The computer-readable storage medium of claim 17, the graphical user interface having user-selectable elements for specifying sampling intervals by time period or by number of instructions.

19. The computer-readable storage medium of claim 16, the acts further comprising:
displaying a graphical user interface that conveys the identified memory access characteristics.

20. The computer-readable storage medium of claim 19, the graphical user interface identifying at least one of memory fragmentation characteristics of the application, memory utilization of data objects the application, memory utilization characteristics of functions of the application, or data objects of the application that were not accessed.

* * * * *